(12) United States Patent
Sutton

(10) Patent No.: US 11,686,529 B2
(45) Date of Patent: Jun. 27, 2023

(54) ROTARY KILN SEAL AND METHOD

(71) Applicant: Shawn Robert Sutton, Houston, PA (US)

(72) Inventor: Shawn Robert Sutton, Houston, PA (US)

(73) Assignee: Sutton Industrial Products LLC, Houston, PA (US)

( * ) Notice: Subject to any disclaimer, the term of this patent is extended or adjusted under 35 U.S.C. 154(b) by 296 days.

(21) Appl. No.: 16/831,218

(22) Filed: Mar. 26, 2020

(65) Prior Publication Data

US 2021/0123676 A1 Apr. 29, 2021

Related U.S. Application Data

(60) Provisional application No. 62/925,012, filed on Oct. 23, 2019.

(51) Int. Cl.
| | |
|---|---|
| *F27B 7/24* | (2006.01) |
| *F16J 15/32* | (2016.01) |
| *F16J 15/3224* | (2016.01) |
| *F16J 15/44* | (2006.01) |
| *F27D 99/00* | (2010.01) |

(52) U.S. Cl.
CPC ............... *F27B 7/24* (2013.01); *F16J 15/32* (2013.01); *F16J 15/3224* (2013.01); *F16J 15/442* (2013.01); *F27D 99/0073* (2013.01)

(58) Field of Classification Search
CPC ........ F16J 15/32; F16J 15/3224; F16J 15/442; F27B 7/24; F27D 99/0073
USPC ........................................................ 432/115
See application file for complete search history.

(56) References Cited

U.S. PATENT DOCUMENTS

| 3,575,397 | A | * | 4/1971 | McDowell | ................ | F27B 7/24 |
| | | | | | | 432/115 |
| 5,571,269 | A | * | 11/1996 | Buelow | ..................... | F27B 7/24 |
| | | | | | | 432/115 |
| 6,589,049 | B1 | * | 7/2003 | Sutton | ....................... | F27B 7/24 |
| | | | | | | 432/115 |
| 2006/0087086 | A1 | * | 4/2006 | Sakakibara | ............... | F27B 7/24 |
| | | | | | | 277/628 |

* cited by examiner

*Primary Examiner* — Steven B McAllister
*Assistant Examiner* — Benjamin W Johnson
(74) *Attorney, Agent, or Firm* — Ansel M. Schwartz

(57) ABSTRACT

A rotary seal assembly for a rotary kiln having a hood and a rotary drum with an opening formed between the drum and the hood, and an end. The rotary seal assembly includes a flexible framework arrangement that attaches to the end. The rotary seal assembly includes a riding surface that engages the drum as the drum rotates. The riding surface includes a series of seal segments with each seal segment having a mounting eye positioned to eliminate a fulcrum point at the mounting eye. The rotary seal assembly includes a seal that is supported by the riding surface and is in essentially 360-degree contact with the drum when it is rotating and seals the opening between the drum when it is rotating in the hood to prevent fluid flow into and out of the end. A rotary seal assembly for a rotary kiln having a hood and a rotary drum with an opening formed between the drum and the hood, and an end, includes redundant tension springs which form a complete 360-degree circle around the drum. A method for sealing an opening formed between a drum and a hood.

13 Claims, 7 Drawing Sheets

ROTARY KILN SEAL AND METHOD

CROSS-REFERENCE TO RELATED APPLICATIONS

This is a nonprovisional of U.S. provisional application Ser. No. 62/925,012 filed Oct. 23, 2019, incorporated by reference herein.

FIELD OF THE INVENTION

The present invention relates to the air or gas sealing arrangements for rotary drums such as high temperature rotary kilns, or more specifically, a flexible seal for sealing the opening between a rotating drum and a stationary hood to prevent the flow of gaseous fluids into and out from the ends of the rotary drum.

BACKGROUND OF THE INVENTION

It is a common practice to employ a flexible seal at the ends of a rotary kiln to seal the annular space between the rotating drum of the kiln and the stationary housing at each end of the kiln. It is desirable to seal these open spaces due to the high temperatures, often exceeding 2500 F in cement applications, found within the kilns. Sealing these spaces provides substantial benefits by confining toxic gases within the kiln and increasing energy efficiency through prevention of loss of the heated gas.

Overlapping leaf type seals such as U.S. Pat. Nos. 4,405,137 and 5,571,269 incorporate metal leaves that flex with the eccentric motion of the rotating drum. Such movement opens up small gaps in between the leaves themselves and in between the leaves and rotating drum. Such openness causes a drop in efficiency of the sealing arrangement.

The present invention is an improvement of U.S. Pat. No. 6,589,049 as described below, and incorporates a framework of pivoting arms and a metallic or non-metallic riding surface that supports a fabric seal such that there is 360-degree contact between the seal and rotating drum surface. The fabric is continuous about the rotating drum and has only one overlap that does not open up. The metallic or non-metallic riding segments are overlapping; however, no gaps open up since they lay flat and slide on the rotating drum parallel to the direction of rotation.

SUMMARY OF THE INVENTION

The present invention pertains to a rotary seal assembly for a rotary kiln having a hood and a rotary drum with an opening formed between the drum and the hood, and an end. The rotary seal assembly comprises a flexible framework arrangement that attaches to the end. The rotary seal assembly comprises a riding surface that engages the drum as the drum rotates. The riding surface includes a series of seal segments with each seal segment having a mounting eye positioned to eliminate a fulcrum point at the mounting eye. The rotary seal assembly comprises a seal that is supported by the riding surface and is in essentially 360-degree contact with the drum when it is rotating and seals the opening between the drum when it is rotating and the hood to prevent fluid flow into and out of the end.

A method for sealing an opening formed between a drum and a hood. The method comprises the steps of attaching a flexible framework arrangement to the hood. There is the step of connecting a riding surface with the framework arrangement so the riding surface engages the drum as the drum rotates in response to the movement of the drum as the drum rotates. The riding surface includes a series of seal segments with each seal segment having a mounting eye positioned to eliminate a fulcrum point at the mounting eye. There is the step of sealing the opening between the drum when it is rotating and the hood to prevent fluid flow into and out of the end with a seal that is supported by the riding surface and is in essentially 360-degree contact with the drum when it is rotating.

The present invention pertains to a rotary seal assembly for a rotary kiln having a hood and a rotary drum with an opening formed between the drum and the hood, and an end. The rotary seal assembly comprises a flexible framework arrangement that attaches to the hood. The rotary seal assembly comprises a riding surface that engages the drum as the drum rotates and connects with the framework arrangement in response to the movement of the drum as the drum rotates. The rotary seal assembly comprises a seal that is supported by the riding surface and is in essentially 360-degree contact with the drum when it is rotating and seals the opening between the drum when it is rotating and the hood to prevent fluid flow into and out of the end. The seal includes redundant tension springs which form a complete 360-degree circle around the drum.

An improved rotary seal assembly for kiln drums and the like utilizes a series of overlapping metal segments mounted to a hood surrounding the drum. The metal segments are connected to the hood via pivoting arms such that there are movable joints at the hood mounting surface and the sealing segments. Pivot arms are affixed to the hood via a mounting ring and intermediate clamping ring. Fabric covers the permeable metal skeleton and is affixed to the hood end via the fixed intermediate and end clamping rings and affixed to the sealing end via a tension device comprised of two continuous metal tension springs. A braided rope packing seals off the open gap between the intermediate clamping ring and the mounting ring.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
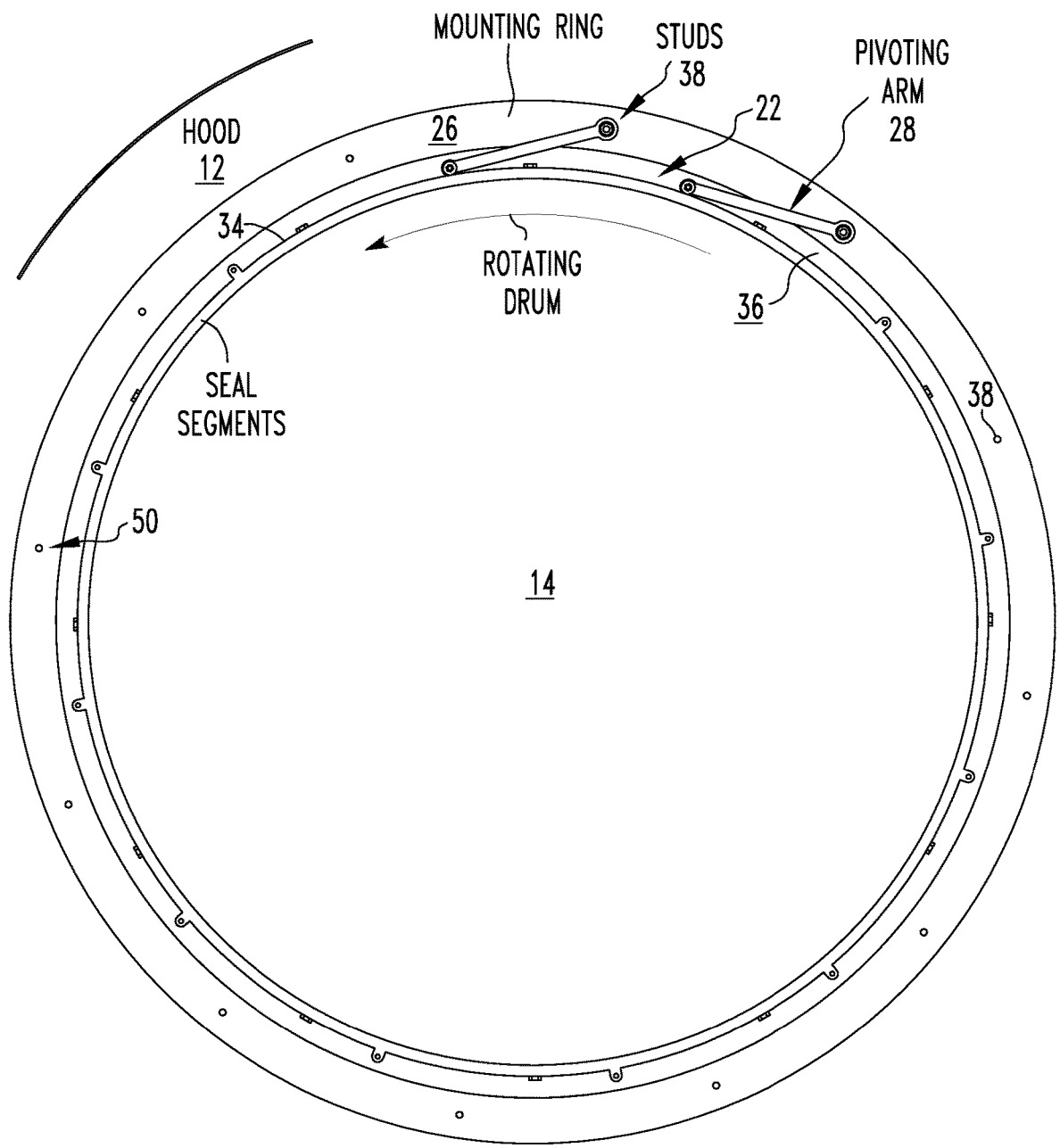
FIG. 1 is a schematic representation of a side view of the assembly of the present invention with the hood and rotating drum.
Figure 2:
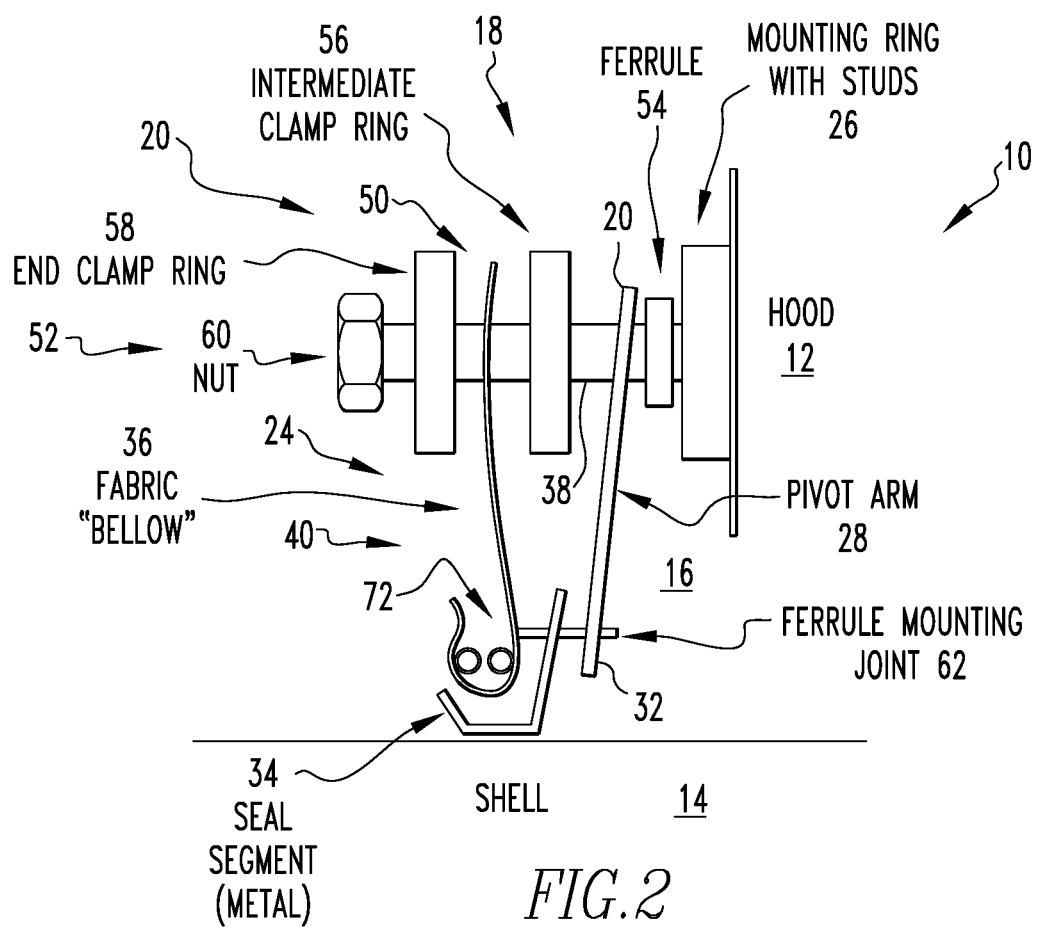
FIG. 2 is a schematic representation of a cross-sectional view of the assembly.

Referring now to the drawings wherein like reference numerals refer to similar or identical parts throughout the several views, and more specifically to FIGS. 1, 2 and 6-8 thereof, there is shown a rotary seal assembly 10 for a rotary kiln having a hood 12 and a rotary drum 14 with an opening 16 formed between the drum 14 and the hood 12, and an end 18. The rotary seal assembly 10 comprises a flexible framework arrangement 20 that attaches to the end 18. The rotary seal assembly 10 comprises a riding surface 22 that engages the drum 14 as the drum 14 rotates. The riding surface 22 includes a series of seal segments 34 with each seal segment 34 having a mounting eye 70 positioned to eliminate a fulcrum point at the mounting eye 70. The rotary seal assembly 10 comprises a seal 24 that is supported by the riding surface 22 and is in essentially 360-degree contact with the drum 14 when it is rotating and seals the opening 16 between the drum 14 when it is rotating and the hood 12 to prevent fluid flow into and out of the end 18.

Figure 3:
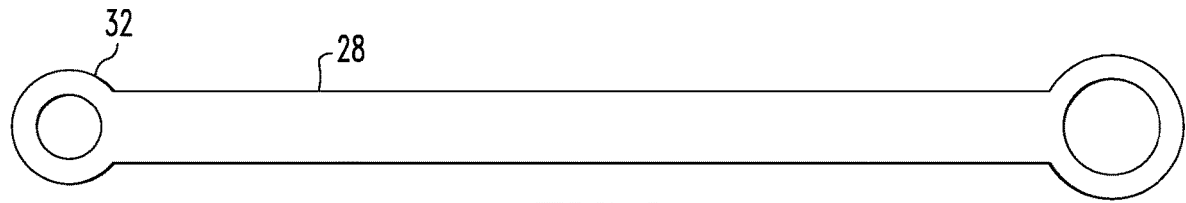
FIG. 3 is a schematic representation of a pivot arm.
Figure 4:
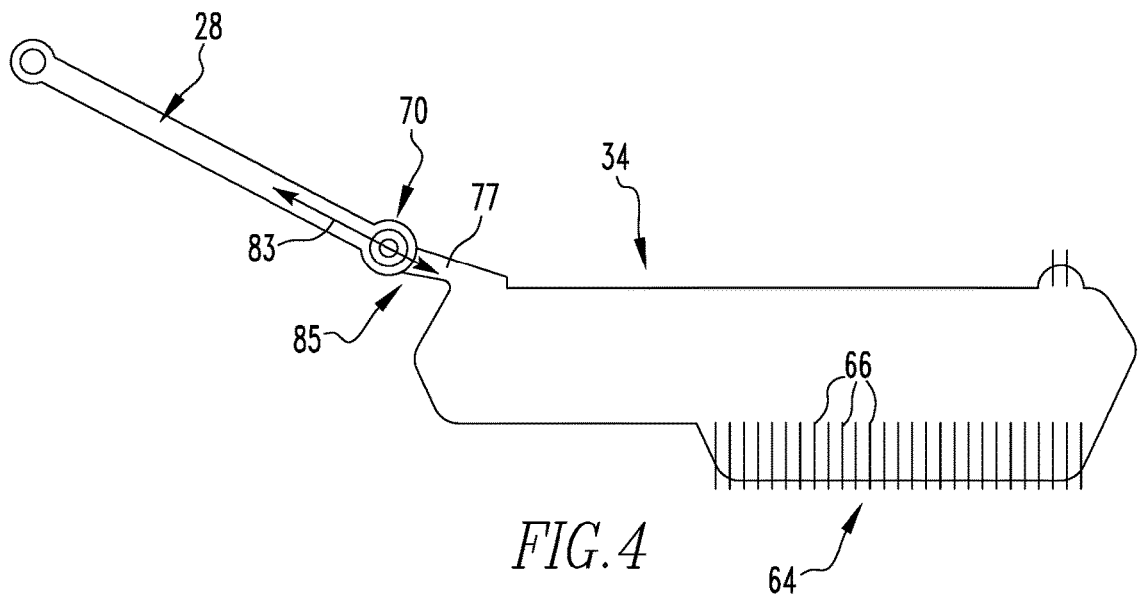
FIG. 4 is a schematic representation of a seal segment.

Preferably, the arrangement 20 includes a mounting ring 26 that fixes to the hood 12. The arrangement 20 preferably includes pivot arms 28 having a first end 30 and a second end 32 that are connected at their first end 30 to the mounting ring 26 and at their second end 32 to the riding surface 22. FIG. 3 shows a pivot arm. Preferably, the riding surface 22 includes a series of seal segments 34 with each seal segment of the series of seal segments 34 connected to the second end 32 of an associated pivot arm of the pivot arms 28. FIG. 4 shows a seal segment.

The seal segments were improved from the original design in three major ways:

1) The seal segment serrated lip was shortened as to not overlap adjacent segments.

The original design had a lip 64 with serrations 66 wherein the lip 64 ran the full length of the seal segment 34. As seal segments 34 were overlapped about the drum 14, the serrations 66 of the lip 64 would be stacked on top of an adjoining overlapping seal segment 34. As the seal 10 moved in response to drum 14 movement, the seal segments 34 would slide over each other. As the seal segments 34 slid, the serrations 66 of the lip 64 would catch on each other and cause the seal segments 34 to bind up and not adjust as designed to movement in the drum 14.

Because of the seal segments 34 binding up when attempting to slide over adjoining seal segments, the lip 64 was shortened such that the lips 64 of adjoining overlapping seal segments 34 would not overlap the lips 64 of other adjoining seal segments 34. Shortening the lip 64 of the seal segments had the effect of comprising a single lip around the entire circumference of an installed seal, with no overlapping of lips 64 of individual seal segments 34. The shortened lip 64 still ensures that the fabric seal 36 will maintain position on top of the seal segments 34, but also ensures that seal segments 34 will have free range of motion without the lip 64 catching on adjoining lips 64.

Figure 10:
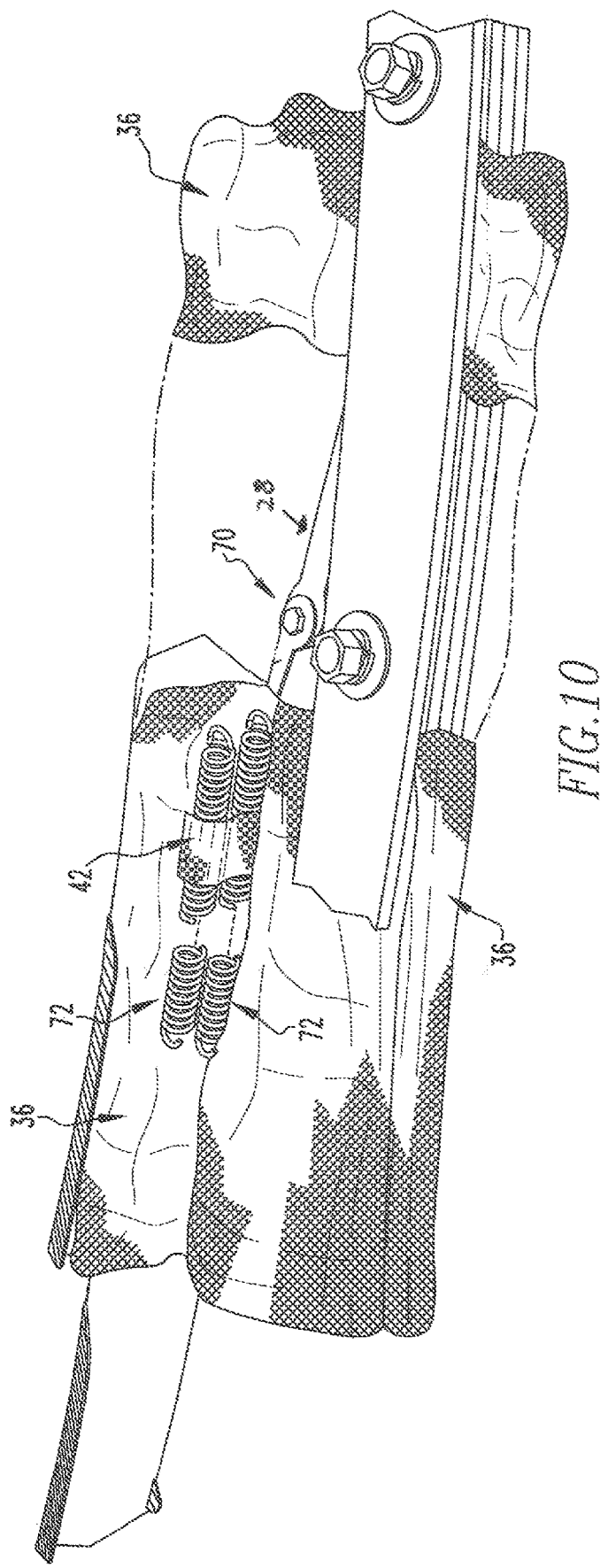
FIG. 10 shows a portion of the seal with belt loops and redundant springs.

2) The serrations themselves were lengthened so that when the serrations 66 are formed, they stand taller over the seal segments 34. This was done to keep the segments in line should one seal segment attempt to jump out of line due to debris or some other material forcing one seal segment 34 out of alignment with an adjoining seal segment. Serrations 66 are approximately 6 in long×1 in high on a standard part. Smaller parts will have smaller lengths of serration. A minimum of 1" gap between serrations of adjacent parts should be maintained to avoid the serrations overlapping each other and potentially locking up each other. See FIGS. 7 and 10.

3) The mounting eye 70 of the seal segment 34 was moved to the trailing edge 85 of the segment 34 and was also angled to reduce stress points and eliminate metal fatigue and buckling.

The original design of the seal segment 34 had the mounting eye 70 of the seal segment 34 located midway along the side of the seal segment 34 and was perpendicular to the seal segment 34 when formed into place. During operation, drag was created by the rotating drum 14 and caused the seal segments 34 to buckle or crack around the area of the mounting eye 70. Once the crack formed, the mounting eye 70 would quickly break off of the seal segments 34 and cause the seal to quickly deteriorate. By having the mounting eye 70 perpendicular to and midway down the side of the seal segment 34, it created a fulcrum point at the base of the mounting eye 70. With enough leverage, the mounting eye 70 would fail at the base of the mounting eye 70 where it attached to the edge of the seal segment 34.

The mounting eye 70 is redesigned to be angled such that it forms a straight line 83 from the mounting ring stud 38 which connects the pivot arm 28 on one end, to the seal segment 34 that is contacting the rotating drum 14. The mounting eye 70 was also moved to the trailing edge 85 of the seal segment 34. This geometry eliminates the fulcrum point of the mounting eye 70 where it connects to the seal segment 34 by creating a straight line 83 of sight between the mounting ring stud 38, pivot arm 28, mounting eye 70, and seal segment 34. With the fulcrum point eliminated, the seal segments 34 do not crack or fatigue around the mounting eye 70 area.

The seal 24 preferably includes a fabric seal 36 in contact with the mounting ring 26 and the series of seal segments 34 about the drum 14. Preferably, the mounting ring 26 includes studs 38 disposed about the drum 14 with the first end 30 of a pivot arm sliding onto a respective associated stud of the studs 38. The seal 24 preferably includes a tensioning assembly 40 which holds the fabric seal 36 under tension against the series of seal segments 34, and the fabric seal 36 and the series of seal segments 34 under tension against the drum 14. Preferably, the fabric seal 36 includes belt loops 42 which holds the continuous tension assembly 40.

The tensioning assembly 40 is replaced by a redundant, continuous 360-degree metal spring 72.

The original tensioning assembly 40 of U.S. Pat. No. 6,589,049 consisted of a tension strap 44 that was laced through belt loops 42. The ends of the strap were laced through metal adjustment buckles 46. Short metal tension springs 48 were affixed between the buckles. Tension was adjusted by sliding the metal adjustment buckles 46 further onto the ends of the tension strap 44 to take up slack. It should be noted that in this paragraph, the element numbering refers to the figures of U.S. Pat. No. 6,589,049.

The new design uses a double continuous spring tensioner 72 that wraps 360 degrees around the seal assembly 10. The double continuous spring tensioner 72 sits side by side and is held in place by belt loops 42 that have been split to become side by side belt loops 42. The side by side belt loops 42 hold each metal spring tensioner 72 in place. There are two springs 72 that creates redundancy so if one spring 72 fails, then the other will maintain tension to keep the seal intact. The springs 72 are in varying standard lengths (10 ft, 5 ft, 2 ft, 6 in). The correct combination of springs 72 is determined when installing the seal. The combined length of the springs 72 should be just long enough to ensure the seal is maintaining 30-degree contact with the rotating drum. There should be just enough tension to ensure the seal maintains 360-degree contact with the rotating drum. Each of the springs 72 have hook ends which affix to each other to position the spring 72 in place.

There were several issues with the original tensioning assembly design that this improvement resolves:

A) The tension strap 44 slid too much when in contact with the fabric seal 36 and thus freely walked around the fabric seal 36 when trying to adjust to seal movement in response to eccentric motion of the rotating drum 14. This led to point B.

B) The metal adjustment buckles would get caught by a belt loop 42 and cause the tensioner assembly 40 to not fully adjust to the eccentric motion (runout) of the rotating drum 14. As the metal adjustment buckle 46 slid with the tension strap 44, it would become lodged in a belt loop 42. This would cause an under correction of the adjoining metal tension spring 48 and caused the metal seal segments 34 to lift off the drum 14 which created open gaps between the seal 10 and the drum 14.

C) The metal tension spring 48 was centrally located and was expected to withstand all the motion of the fixed length tensioning assembly 40 by absorbing expansion and contraction within just a few inches of distance between the metal adjustment buckles 46. As the tension strap 44 is pulled horizontally by the metal tension spring 48, it did not have enough downforce to adequately hold the seal 10 in place. As a result, the metal tension spring 48 had to be stretched more to make up for the loss of downward force of the fixed length tension strap 44.

D) The tensioning assembly 40 was a standalone device for holding the entire seal 10 together against the rotating drum 14. Should any component of the tensioning assembly 40 fail, then the entire seal 10 would fail.

The improved design uses a double metal tension spring 72 (2 separate springs 72 wrapped 360 degrees about the seal 10) that provide redundancy. If one spring fails, then the other spring 72 would provide enough tension to insure the functionality of the seal 10. This allows the operator to continue running the process without having to shut down for an emergency seal 10 repair.

The improved design provides for consistent downforce of the redundant metal tension spring to ensure that all sealing segments 34 and the fabric seal 36 received an equal amount of tension that allows for a consistent and uniform seal about the drum 14. Expansion and contraction of the 360-degree metal tension springs 72 is minimized to small areas about the spring since the entire tensioning assembly 40 is expandable and not concentrated in one small area.

360-degree redundant metal tension springs 72 pass easily through belt loops 42 in the fabric seal 36. This alleviates over or under correction of the short metal tension springs 48 as the continuous springs pass freely through the belt loops 42 in response to drum 14 movement. As the continuous spring 72 expands and contracts, it remains in place by simply sliding very little over the fabric seal 36 to adjust for runout of the drum 14, and then simply sliding back into its original position in relation to the specific area of the continuous tension spring.

Overall, the seal 10 will be better performing and also more secure than the prior art. The shortened serrated section on the sides of the wear segments will eliminate the serrations 66 catching on adjacent serrated edges thus eliminating the possibility of the wear segments locking together and lifting off of the rotating drum surface. A smooth sliding action is realized with the improvement, thus maintaining 360-degree constant contact with the rotating drum. Moving the seal segment eye 70 to the rear of the segments, and sweeping the neck 77 of the eye 70 more in line with the segment, improves longevity as the chance for metal fatigue at the eye is all but eliminated due to the drastic reduction of the fulcrum point angle of attack. The redundant spring system replaces the spring-loaded tension strap and provides insurance that if one of the springs fails, that the seal will continue to function as normal until the broken spring can be replaced.

Figure 5:
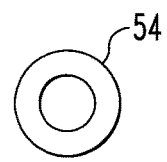
FIG. 5 is a schematic representation of a ferrule.
Figure 6:
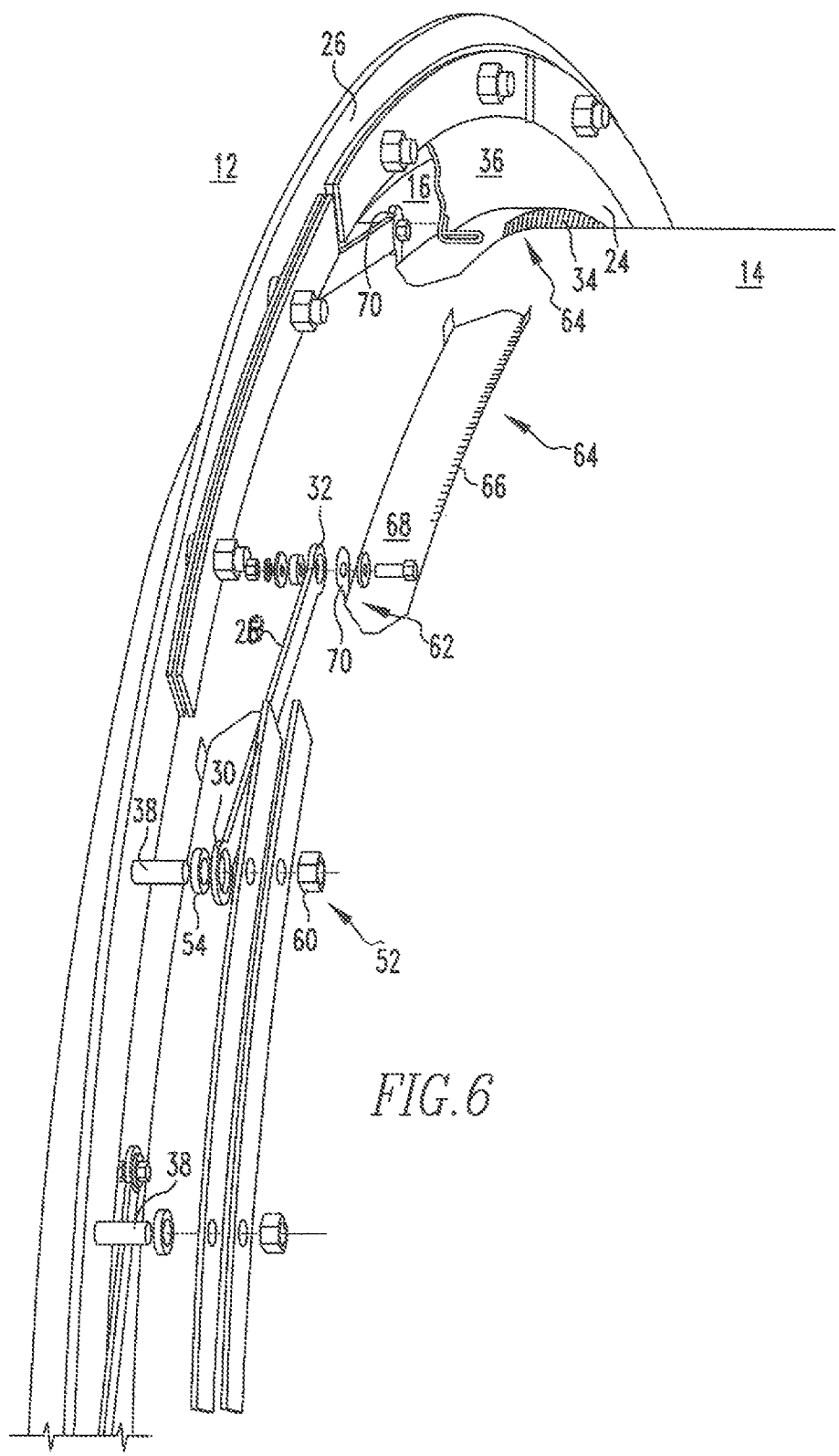
FIG. 6 is a schematic representation of a perspective view of the assembly.
Figure 7:
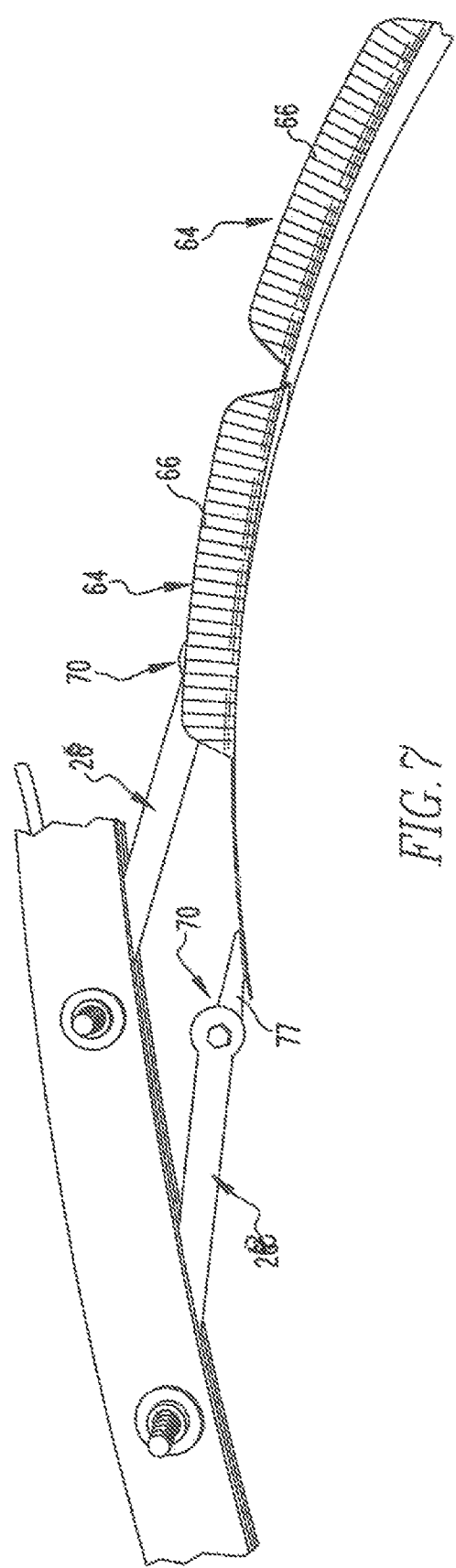
FIG. 7 is a schematic representation of an elevational view of the assembly.
Figure 8:
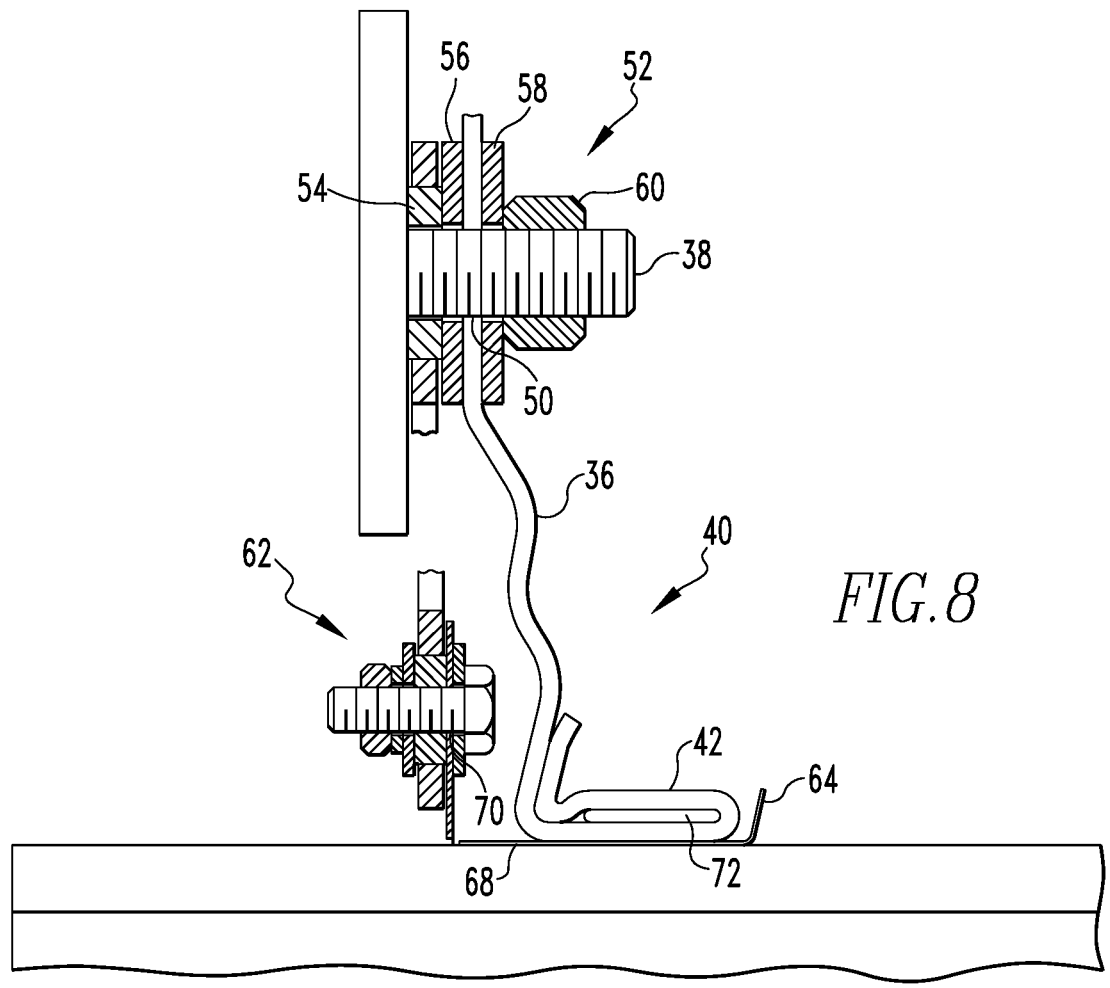
FIG. 8 is a schematic representation of a sectional view of FIG. 7.
Figure 9:
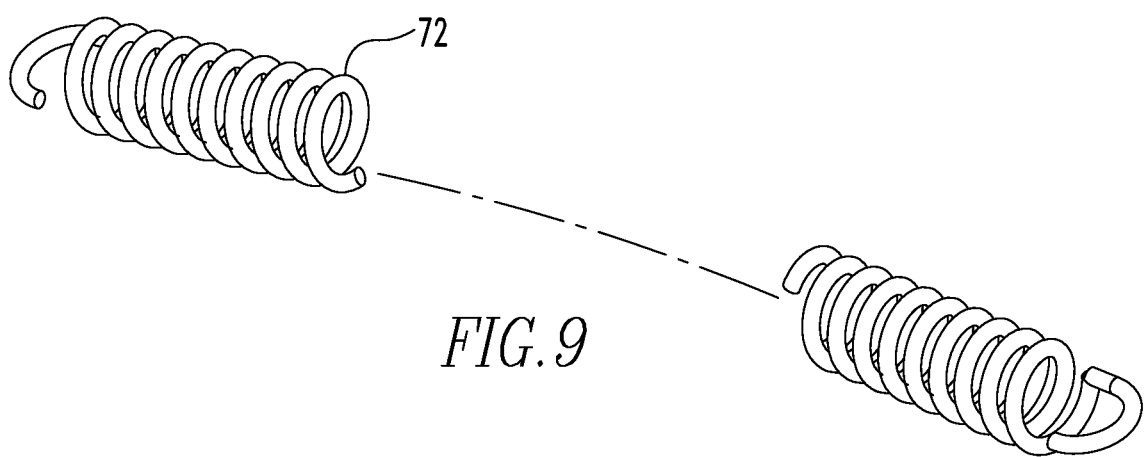
FIG. 9 is a schematic representation of a tension spring.

The fabric seal 36 has bolt holes 50 arranged to align with the studs 38 of the mounting ring 26 so each bolt hole of the bolt holes 50 slides on a respective associated stud. Preferably, the arrangement 20 includes a locking assembly 52 at each stud to hold the seal fabric and the pivot arm to the mounting ring 26. The locking assembly 52 preferably includes a ring ferrule 54 disposed on the stud between the mounting ring 26 and the pivot arm, an intermediate clamp ring 56 disposed on the stud between the pivot arm and the fabric seal 36, an end clamp ring 58 disposed on the stud over the fabric seal 36, and a nut 60 disposed on the stud over the end clamp ring 58. FIG. 5 shows a ferrule. Preferably, the riding surface 22 includes a ferrule mounted joint 62 associated with each seal segment which movably holds the pivot arm to the seal segment.

The present invention pertains to a rotary seal assembly 10 for a rotary kiln having a hood 12 and a rotary drum 14 with an opening 16 formed between the drum 14 and the hood 12, and an end 18, as shown in FIGS. 1, 2 and 6-8. The rotary seal assembly 10 comprises a flexible framework arrangement 20 that attaches to the hood 12. The rotary seal assembly 10 comprises a riding surface 22 that engages the drum 14 as the drum 14 rotates and connects with the framework arrangement 20 in response to the movement of the drum 14 as the drum 14 rotates. The rotary seal assembly 10 comprises a seal 24 that is supported by the riding surface 22 and is in essentially 360 degree contact with the drum 14 when it is rotating and seals the opening 16 between the drum 14 when it is rotating and the hood 12 to prevent fluid flow into and out of the end 18. The seal includes redundant tension springs which form a complete 360-degree circle around the drum.

The present invention pertains to a method for sealing an opening 16 formed between a drum 14 and a hood 12. The method comprises the steps of attaching a flexible framework arrangement 20 to the hood 12. There is the step of connecting a riding surface 22 with the framework arrangement 20 so the riding surface 22 engages the drum 14 as the drum 14 rotates. The riding surface 22 includes a series of seal segments 34 with each seal segment 34 having a mounting eye 70 positioned to eliminate a fulcrum point at the mounting eye 70. There is the step of sealing the opening 16 between the drum 14 when it is rotating in the hood 12 to prevent fluid flow into and out of the end 18 with a seal 24 that is supported by the riding surface 22 and is in essentially 360-degree contact with the drum 14 when it is rotating.

Preferably, there is the step of fixing a mounting ring 26 of the arrangement 20 to the hood 12. There is preferably the step of connecting pivot arms 28 of the arrangement 20 at their first end 30 to the mounting ring 26 and at their second end 32 to the riding surface 22. Preferably, there is the step of connecting a series of seal segments 34 of the riding surface 22 to the second end 32 of an associated pivot arm of the pivot arms 28. Them is preferably the step of including studs 38 with sliding the first end 30 of a pivot arm onto a respective associated stud of a plurality of studs 38 of the mounting ring 26 disposed about the drum 14.

Preferably, there is the step of holding the fabric seal 36 under tension against the series of seal segments 34, and the fabric seal 36 and the series of seal segments 34 under tension against the drum 14 with a redundant tensioning spring 40. There is preferably the step of holding the seal fabric and the pivot arm to the mounting ring 26 with a locking assembly 52 of the arrangement 20. Preferably, there are the steps of disposing a ring ferrule 54 of the locking assembly 52 on the stud between the mounting ring 26 and the pivot arm, disposing an intermediate clamp ring 56 of the locking assembly 52 on the stud between the pivot arm and the fabric seal 36, disposing an end clamp ring 58 of the locking assembly 52 on the stud over the fabric seal 36, and disposing a nut 60 of the locking assembly 52 on the stud 38 over the end clamp ring 58. There is preferably the step of holding the pivot arm to the seal segment with a ferrule mounted joint 62 of the riding surface 22.

In the operation of the invention, and with reference to FIGS. 1, 2 and 6-8, the mounting structure comprises a braided rope packing affixed to the outer edge of the mounting ring 26 with adhesive. This will seal the open gap formed between the mounting ring 26 and the intermediate clamping ring when installed. A metal mounting ring 26 is manufactured such that it affixes (bolts or welds) directly to a hood 12 surrounding a rotating drum 14. The hood 12 face is at a 90-degree angle to the outside surface of the drum 14. The mounting ring 26 has studs 38 welded into it which are perpendicular to the face of the ring. An intermediate clamping ring 56 and an end clamping ring 58 of equal outer and inner diameters is manufactured with bolt holes 50 similar to the mounting ring 26 stud pattern such that the clamping rings slide over the studs 38 and affixes the sealing components in place. The clamping rings are held tight with flat washers, lock washers, and nuts 60. Rings are produced internally whereas nuts 60, studs 38, and washers are bought out items.

In regard to the seal components and metal skeleton support, the skeleton of this seal 24 is comprised of a pivoting arm, attached at one end 30 to the mounting structure. At the other end 32 of the pivot arm is an attached metal segment that rides directly on the drum 14 outer surface or on a wear ring fixed to the drum 14 at an equidistant annular spacing. The second end 32 of the pivot arm connects to the seal segment through a ferrule mounted joint 62 mounted to a mounting eye 70 of the seal segment.

The pivot arm attaches to the mounting ring 26 by sliding the arm over the mounting studs 38 and a ferrule that allows for the pivoting action. The intermediate clamping ring slips over the mounting studs 38 and traps the ferrules and the pivot arm in place while allowing movement of the pivot arm. The metal segments are attached to the other end of the pivot arm with a nut 60 and bolt assembly. A ferrule is inserted over a bolt whereas the pivot arm slides over the ferrule thus allowing movement similar to the mounting joint. A flat washer, lock washer, and nut 60 hold the attachment together. This series is repeated several times to produce an overlapping surface of the metal segments riding against the drum 14 or the wear ring. Ferrules, arms, metal segments are manufactured by internal manufacturing processes, whereas nuts 60, bolts, and washers are bought out items.

A fabric cover typically made of silica Dioxide fabric is sewn into a cover that seals off the annular open gap between the inner diameter of the mounting ring 26 and the drum 14. This fabric cover has relief slits cut into one edge that allows for expansion of the outer diameter of the fabric cover to match the outer diameter of the mounting ring 26. Bolt holes 50 are punched into the fabric to allow for sliding fabric over the studs 38 in the mounting ring 26. The end clamping ring slips over the studs 38 in the mounting ring 26 and traps the fabric in place. Nuts 60, flat washers, and lock washers secure the assembly together. The fabric descends perpendicularly to the metal seal segments 34 and bends 90 degrees at the seal segment top surface, and projects outward to the outside lip 64 of the metal seal segment. Split Belt loops 42 are sewn into the fabric that allows for a redundant continuous metal spring assembly 72 to be placed through the belt loops 42 about the entire length of the seal fabric 36. This continuous spring 72 tension assembly provides tension for the sealing assembly such that it makes 360-degree contact with the drum 14.

As the drum 14 rotates, it displaces radially the seal segments 34 that are held to it by the tensioning belt. The drum 14 slides along the seal segments 34, as the seal segments 34 are essentially held in their angular position as the drum 14 slides along them during its rotation. Each individual seal segment moves radially up or down with the rotating surface of the drum 14 due to the individual seal segment being held in its position by the pivot arm connected to the stud on the mounting ring 26 which is attached to the hood 12. The pivot arm is able to slide relative to the stud on the mounting ring 26 to which it is attached, and the ferrule mounted joint 62 adjacent the seal segment which holds the pivot arm to the seal segment. In this way, the seal segment is able to move with the surface displacement of the drum 14 as the drum 14 rotates by sliding relative to the ferrule mounted joint 62 and to the stud.

The seal fabric extends from the studs 38 on the mounting ring 26 to the seal segment where it is held along the seal contact area 68 of the seal segment by the redundant continuous metal spring 72 that wraps about all the seal segments 34 and the drum 14. There is a lip 64 that is serrated along the seal segment that prevents the continuous metal springs 72 and seal fabric 36 from sliding off the seal segment. The serrations 66 are close together to allow the seal segment to bend but have only a small or minimal gap formed between the serrations 66 as the seal segment bends under the tension of the continuous tension spring 72 and follows the circular shape of the drum 14.

Installation of the rotary seal assembly 10 is as follows:

The mounting/clamping ring is supplied in segments (halves, quarters, etc.) to ease assembly. Rotate the drum 14 if possible and mark the high and low spot of rotation on the hood 12 face. Use the center of these two lines as the reference for welding. This will ensure that the + and − runout is evenly distributed. The center reference line is where the mounting ring 26 tack welds directly to the feed/discharge hood 12.

1) Run a belt sander or grinder over the drum surface around the sealing area to remove any rust, weld spatter, beads, or product buildup. If the drum walks longitudinally during operation, sand the area also where the seal 24 will ride.

2) Insert the large ferrules over the mounting studs 38 on the mounting ring 26.

3) Mount the pre-assembled modules, each of which include the seal segment 34 and the pivot arm 28, such that the serrated lip 64 is facing out from the mounting ring 26. Overlap the segments according to the direction of rotation.

4) Trap the modules in place with the intermediate clamping ring 56. You can finger tighten the bolts such that the modules align properly.

5) Pre-lace the continuous metal tension springs 72 through the belt loops 42 in the fabric.

6) Starting at the top, remove the finger tightened nuts 60 and position the seal fabric 36 such that it forms a 90-degree angle with the drum and lays flat on top of the metal seal segments 34. Cut relief slits in the seal 24 to the depth of the bolt circle only. The slits should line up with the studs 38 in the ring. This will "relax" the seal 24 on the mounting ring 26 as well as relieve the "pucker" on the sealing segments. The fabric should have enough clearance as to "bellow" up and down with the drum run-out. Work your way down the sides fairly evenly aligning and cutting slits. As sufficient slits am aligned, clamp the seal 24 in place with the end clamping ring segments 58.

7) At the bottom of the kiln, make sure there is not severe seal sag between the ring and the drum (this will cause the seal 24 to wander and possibly jump the metal segments).

8) Make sure the overlap at the bottom corresponds with the direction of rotation. If installed backwards, the seal 24 will bind up and fail.

9) Stretch the metal tension springs 72 far enough to attach to the other ends of the springs to form a complete 360-degree circle.

10) Check the sag at the bottom of the seal 24. A slight gap (⅛" to ¼") is desirable at the bottom. This will allow for thermal expansion of the drum when heated.

11) Rotate the drum while pulling operating draft (if possible) to test the seal 24 fit prior to firing and operation. Less draft and burner will be needed as a result of the seal 24. Observe the fit around the sealing surface. Adjust the fit accordingly remembering to allow for thermal drum expansion. The seal 24 only needs to make light continuous contact with the drum to be an effective seal. Cranking it down tight to the drum does not enhance sealing properties. Overtightening will cause the seal 24 to wear much faster and possibly buckle and misalign itself.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A rotary seal assembly for a rotary kiln having a hood and a rotary drum with an opening formed between the drum and the hood, wherein the rotary seal assembly comprises: a flexible framework arrangement having a mounting ring, studs and pivot arms that attaches to the hood; a riding surface that engages the drum and connects with the framework arrangement in response to the movement of the drum as the drum rotates, the riding surface includes a series of seal segments with each seal segment having a mounting eye, each mounting eye disposed at a corner portion at one end of each seal segment, each seal segment having a serrated lip such that lips of adjoining overlapping seal segments do not overlap lips of other adjoining seal segments; and a seal that is supported by the riding surface and is in essentially 360-degree contact with the drum when it is rotating via the riding surface and that seals the opening between the drum when it is rotating and the hood to prevent fluid flow into and out of the opening, wherein the lip of each seal segment ensures that the seal will maintain position on top of each seal segment and also ensures that the seal segments will have free range of motion without the lip of each seal segment catching on any other lip of an adjoining seal segment.

2. An assembly as described in claim 1 wherein the mounting ring of the flexible framework arrangement fixes to the hood.

3. An assembly as described in claim 2 wherein the pivot arms of the flexible framework arrangement have a first end and a second end that are connected at their first end to the mounting ring and at their second end to the riding surface.

4. An assembly as described in claim 3 wherein each seal segment of the series of seal segments is connected to the second end of an associated pivot arm of the pivot arms.

5. An assembly as described in claim 4 wherein the seal includes a fabric seal in contact with the mounting ring and the series of seal segments.

6. An assembly as described in claim 5 wherein the studs are about the drum with the first end of a pivot arm sliding onto a respective associated stud of the studs.

7. An assembly as described in claim 6 wherein the seal includes tensioning springs which hold the fabric seal under tension against the series of seal segments, and the fabric seal and the series of seal segments under tension against the drum.

8. An assembly as described in claim 7 wherein the fabric seal includes belt loops and redundant tension springs which are laced through the belt loops.

9. An assembly as described in claim 8 wherein the arrangement includes a locking assembly at each stud to hold the seal fabric and a respective pivot arm to the mounting ring.

10. An assembly as described in claim 9 wherein the locking assembly includes a ring ferrule disposed on the stud between the mounting ring and a respective pivot arm, an intermediate clamp ring disposed on the stud between a respective pivot arm and the fabric seal, an end clamp ring disposed on the stud over the fabric seal, and a nut disposed on the stud over the end clamp ring.

11. An assembly as described in claim 10 wherein the riding surface includes a ferrule mounted joint associated with each seal segment which movably holds a respective pivot arm to each seal segment.

12. A rotary seal assembly as described in claim 1 wherein the seal includes redundant tension springs which form a complete 360-degree circle around the drum, the redundant tension springs disposed alongside each other.

13. A method for sealing an opening formed between a drum and a hood comprising the steps of: attaching a flexible framework arrangement to the hood wherein the flexible framework arrangement comprises a mounting ring, studs and pivot arms: connecting a riding surface with the flexible framework arrangement so that the riding surface engages the drum in response to movement of the drum as the drum rotates, wherein the riding surface includes a series of seal segments with each seal segment having a mounting eye, each mounting eye disposed at a corner portion at one end of each seal segment, each seal segment having a serrated lip such that lips of adjoining overlapping seal segments do not overlap lips of other adjoining seal segments; and sealing the opening between the drum when it is rotating and the hood to prevent fluid flow into and out of the opening with a seal that is supported by the riding surface and is in essentially 360-degree contact with the drum when it is rotating via the riding surface, wherein the lip of each seal segment ensures that the seal will maintain position on top of each seal segment and also ensures that the seal segments will have free range of motion without the lip of each seal segment catching on any other lip of an adjoining seal segment.

* * * * *